(12) United States Patent
Nagaraj et al.

(10) Patent No.: US 8,599,920 B2
(45) Date of Patent: Dec. 3, 2013

(54) INTENSITY COMPENSATION TECHNIQUES IN VIDEO PROCESSING

(75) Inventors: Raghavendra C Nagaraj, San Diego, CA (US); Sumit Mohan, San Diego, CA (US); Narendranath Malayath, San Diego, CA (US); Aravind Bhaskara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 861 days.

(21) Appl. No.: 12/185,889

(22) Filed: Aug. 5, 2008

(65) Prior Publication Data

US 2010/0034270 A1    Feb. 11, 2010

(51) Int. Cl.
*H04N 7/12* (2006.01)

(52) U.S. Cl.
USPC ..................................... 375/240.16

(58) Field of Classification Search
None
See application file for complete search history.

(56) References Cited

U.S. PATENT DOCUMENTS

| | | | |
|---|---|---|---|
| 2003/0118111 A1* | 6/2003 | Kim et al. | 375/240.24 |
| 2005/0053155 A1 | 3/2005 | Holcomb et al. | |
| 2005/0101319 A1 | 5/2005 | Murali et al. | |
| 2006/0007425 A1* | 1/2006 | Rueger et al. | 356/72 |
| 2006/0133495 A1 | 6/2006 | Ye et al. | |
| 2007/0014479 A1 | 1/2007 | Kim et al. | |
| 2007/0036219 A1 | 2/2007 | Choi et al. | |
| 2007/0230563 A1 | 10/2007 | Tian et al. | |
| 2008/0069219 A1* | 3/2008 | Pearson et al. | 375/240.16 |

FOREIGN PATENT DOCUMENTS

| | | |
|---|---|---|
| CN | 1870757 A | 11/2006 |
| EP | 1599049 A2 | 11/2005 |
| JP | 2007516640 A | 6/2007 |
| JP | 2008526119 A | 7/2008 |
| JP | 2010504692 A | 2/2010 |
| JP | 2010136383 A | 6/2010 |
| WO | 2005027496 A2 | 3/2005 |
| WO | WO2008036267 A2 | 3/2008 |

OTHER PUBLICATIONS

International Search Report & Written Opinion—PCT/US2009/052753, International Search Authority—European Patent Office—Jan. 15, 2010.

* cited by examiner

*Primary Examiner* — Andrew Lai
*Assistant Examiner* — Leon Andrews
(74) *Attorney, Agent, or Firm* — Brent Boyd

(57) ABSTRACT

Techniques for intensity compensation in video processing are provided. In one configuration, a wireless communication device compliant with the VC1-SMPTE standard (e.g., cellular phone, etc.) comprises a processor that is configured to execute instructions operative to reconstruct reference frames from a received video bitstream. A non-intensity-compensated copy of a reference frame of the bitstream is stored in a memory of the device and used for defining the displayable images and for on-the-fly generation of a stream of intensity-compensated pixels to perform motion compensation calculations for frames of the video bitstream.

25 Claims, 8 Drawing Sheets

INTENSITY COMPENSATION TECHNIQUES IN VIDEO PROCESSING

BACKGROUND

1. Field

The present disclosure relates generally to the field of video processing and, more specifically, to techniques for intensity compensation in video processing.

2. Background

The amounts of digital information included in video data are massive and tend to increase along with advances in performance of video cameras. Processing of the video data places large demands on memory, computational and power requirements resources of video-enabled devices and, in particular, wireless communication devices such as cellular phones, personal digital assistants (PDAs), laptop computers, and the like.

In the video processing systems compliant with the VC1-SMPTE standard, which is a video codec specification standardized by the Society of Motion Picture and Television Engineers (SMPTE), frame reconstruction and motion compensation are presently performed using pre-stored copies of both non-intensity-compensated and intensity-compensated reference frames of the received video bitstream. In particular, the VC1-SMPTE standard defines block-based motion compensation and spatial transform schemes that includes Simple, Main, and Advanced profiles of compression of the reference frames.

In operation, multiple copies of the reference frames consume large blocks of memory and impose increased bandwidths requirements for their storing and retrieval. Although video compression significantly reduces redundancy of raw video data, such processing techniques may decrease overall performance and consumer-critical characteristics (for example, battery life, talk time, etc.) of the wireless communication devices.

There is therefore a need for improved techniques for intensity compensation in video processing.

SUMMARY

Techniques for intensity compensation in video processing are described herein. In one embodiment, a wireless communication device compliant with the VC1-SMPTE standard (e.g., cellular phone, etc.) comprises a processor configured to execute instructions operative to reconstruct and store as reference frames from a received video bitstream. A non-intensity-compensated copy of a reference frame of the bitstream is stored in a memory of the device. In operation, this copy of the reference frame is used to generate on-the-fly (i.e., in real-time) a stream of intensity-compensated pixels to perform motion compensation calculations for frames of the video bitstream and to define displayable images.

Various other aspects and embodiments of the disclosure are described in further detail below.

The Summary is neither intended nor should it be construed as being representative of the full extent and scope of the present disclosure, which these and additional aspects will become more readily apparent from the detailed description, particularly when taken together with the appended drawings.

Figure 1:
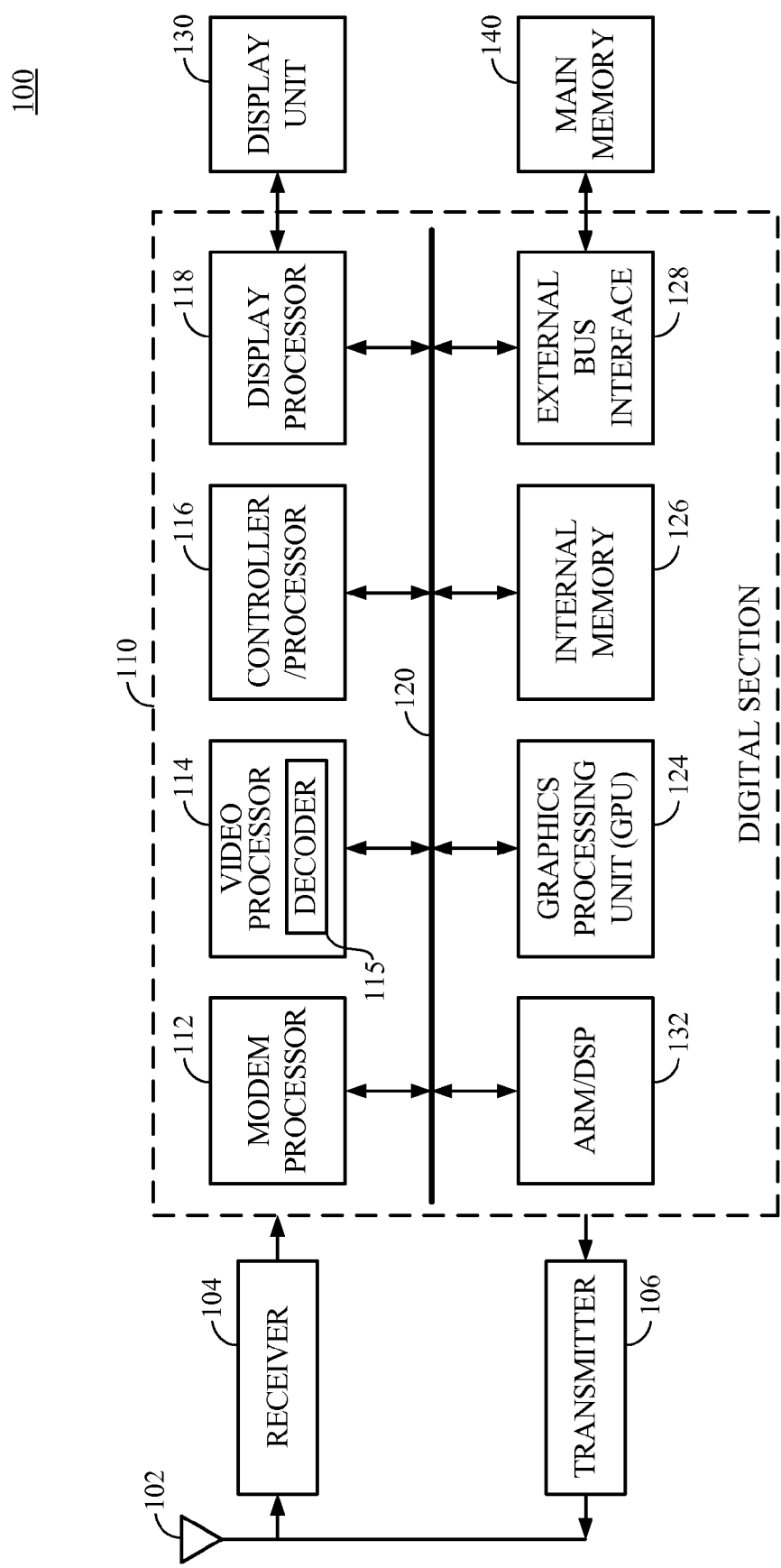
FIG. 1 shows a general block diagram of a wireless device.

To facilitate understanding, identical reference numerals have been used, where possible, to designate identical elements that are common to the figures, except that suffixes may be added, when appropriate, to differentiate such elements. The images in the drawings are simplified for illustrative purposes and are not necessarily depicted to scale. It is contemplated that features of some configurations may be beneficially incorporated in other configurations without further recitation.

The appended drawings illustrate exemplary configurations of the disclosure and, as such, should not be considered as limiting the scope of the disclosure that may admit to other equally effective configurations.

DETAILED DESCRIPTION

The word "exemplary" is used herein to mean "serving as an example, instance, or illustration." Any configuration or design described herein as "exemplary" is not necessarily to be construed as preferred or advantageous over other configurations or designs. Hereafter, the terms "core", "engine", "machine", "processor" and "processing unit", as well as the terms "frame" and "picture" are used interchangeably.

The techniques described herein may be used for wireless communications, computing, personal electronics, handsets, etc. An exemplary use of the techniques for wireless communications is described below.

FIG. 1 shows a block diagram of a configuration of a wireless device 10 used in a wireless communication system (not shown). The wireless device 10 may be a cellular phone (i.e., handset), a video game console, a PDA, a laptop computer, a video or audio/video enabled device, or a server. The wireless communication system may be, e.g., a Code Division Multiple Access (CDMA) system or a Global System for Mobile Communications (GSMC), among other wireless communication systems.

The wireless device 100 includes an antenna 102, a receiver 104, a transmitter 106, a digital section 110, a display unit 130, and a main memory 140. Bi-directional communications with a respective base station are provided via receive and transmit paths. In the receive path, signals transmitted by a base station of a wireless communication system are received by the antenna 102 and provided to the receiver 104. The receiver 104 demodulates the received signals and forwards them for further processing to the digital section 110. In the transmit path, the transmitter 106 acquires from the digital section 110 data to be transmitted, generates a carrier signal modulated by the data, and forwards the modulated carrier signal to the antenna 102 for transmitting to the base station.

The digital section 110 generally includes a plurality of processing, interface, and memory modules. In the depicted exemplary embodiment, the digital section 110 illustratively comprises a modem processor 112, a video processor 114, a controller/processor 116, a display processor 118, an Advanced RISC (reduced instruction set computer) Machine/digital signal processor (ARM/DSP) 122, a graphics processing unit (GPU) 124, an internal memory 126, an internal bus 120, and an external bus 128 coupled to the main memory 140.

In operation, the controller/processor 116 administers elements of the digital section 110. The modem processor 112 performs processing (e.g., modulation/demodulation) of data received from the receiver 104 or directed to the transmitter 106. The video processor 114 performs processing such as encoding/decoding, or codec, operations for video bitstreams (e.g., still or motion images) produced by video applications such as a camcorder, video playback, video conferencing, etc. Accordingly, the display processor 118 provides rendering of the decoded images on the display unit 130 of the wireless device 100.

The GPU 124, in combination with the ARM/DSP 122, facilitates graphics processing operations for the wireless device 100. The GPU 124 may be compliant, for example, with a document "OpenGL Specification, Version 1.0," Jul. 28, 2005, which is publicly available. This document is a standard for 2D vector graphics suitable for handheld and mobile devices, such as cellular phones and other referred to above wireless communication apparatuses. Additionally, the GPU 124 may also be compliant with OpenGL2.0, OpenGL ES2.0, or D3D9.0 graphics standards.

Modules of the digital section 110 may be fabricated as or include application specific integrated circuits (ASICs), RISCs, field programmable gate arrays (FPGAs), micro-controllers or microprocessors, among other types of integrated circuits.

Raw video bitstream received or transmitted by the wireless device 100 is generally compressed using video coding techniques compliant with one or more of industry-adapted video compression and communication standards. In one embodiment, the raw video bitstream is compliant with the VC1-SMPTE standard.

Decoding a VC1-SMPTE-compliant video bitstream and rendering of the respective content requires reconstruction of a plurality of video frames and generation of both non-intensity-compensated and intensity-compensated reference frames when intensity compensation is enabled for the given reference frame, which are then used for image displaying and motion compensation purposes, respectively.

In the digital section 110, the video processor 114 comprises a decoder 115 configured to perform on-the-fly intensity compensation calculations for the reference frames, thus increasing effectiveness of utilization of memory, computational, and power resources of the wireless device 100. In particular, the decoder 115 eliminates the need for storing in the internal memory 126 (or main memory 140) copies of the intensity-compensated reference frames. Reference pixels (i.e., pixels of the reference frames) are intensity-compensated as and when they are used for motion compensation. Intensity Compensation may need to be performed twice on the reference pixels because the same reference pixels may be referred to twice by different frames/fields. In this case, results of the first stage of intensity compensation are used in the second stage of intensity compensation.

The VC1-SMPTE standard defines block-based motion compensation and spatial transform schemes that includes Simple, Main, and Advanced profiles of compression, where the Main profile is a set of Simple profiles, and Advanced profile is a set of Main profiles. For the Main profile, intensity compensation is performed on one reference frame only, and whenever reference pixels are accessed for motion compensation, these pixels are on-the-fly intensity compensated using a one-stage intensity compensation procedure. For the Advanced profile, the same reference frame may be used for motion compensation twice, and for such a frame on-the-fly intensity compensation is performed twice. Firstly, on-the-fly intensity compensation is performed with one set of parameters and then the result of that procedure is similarly intensity compensated with a separate set of parameters.

Figure 2:
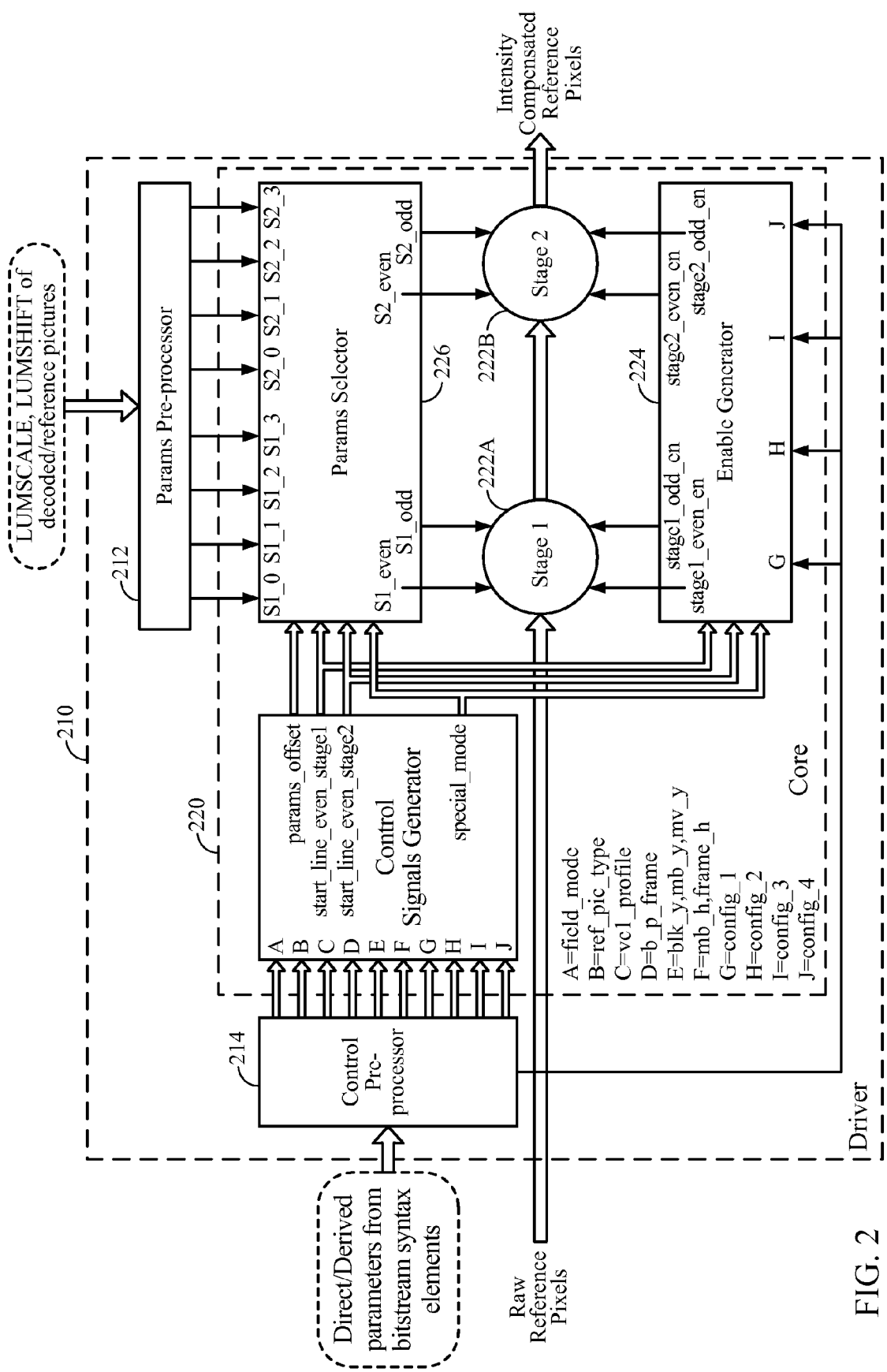
FIG. 2 shows a high-level block diagram of a decoder configured for the on-the-fly generation of intensity-compensated reference frames.

FIG. 2 shows a high-level block diagram of the decoder 115. Generally, the decoder 115 includes a Driver 210 and a Core 220. The Driver 210 comprises a Parameters Pre-processor 212 and a Control Pre-processor 214, and the Core 220 comprises Stages 222A and 222B, an Enable Generator 224, a Parameters Selector 226, and a Control Signals Generator 228.

The Parameters Pre-processor 212 is provided with LUMSCALE and LUMSHIFT syntax elements derived from the video bitstream. Specifically, the LUMSCALE is 6-bit syntax element present in P-picture headers if Intensity Compensation mode is ON, and the LUMSHIFT is a 6-bit syntax element present in P-picture headers if Intensity Compensation mode is ON.

The Parameters Pre-processor 212 operates once per slice and translates the LUMSCALE and LUMSHIFT syntax elements to <iscale> and <ishift> parameters for the Core 220, where the <iscale> is a linear scaling parameter for scaling the reference pixels, and the <ishift> is an offset parameter added to the scaled reference pixels.

Properties S1_x and S2_x, where (x=0 . . . 3), are defined by the concatenated <iscale> and <ishift> parameters and used by the Stages 222A, 222B in calculations of Intensity Compensation values for pixels of the reference frames. Properties corresponding to x=0 and x=1 are used in the Intensity Compensation calculations for P-frames and forward anchor Intensity Compensation in B-frames, and properties corresponding to x=2 and x=3 are used for the backward anchor Intensity Compensation in B-frames. Intensity Compensation may need to be performed differently for the top and bottom reference fields because they may be decoded independently and, consequently, their reference pattern may different.

In the field prediction mode, the even indexed parameters (correspond to x=0 and x=2) are applied to the top reference fields, and the odd indexed parameters (correspond to x=1 and x=3) are applied to the bottom reference fields. If the respective reference frame and the frame being decoded are in a frame coding mode, the even indexed parameters are applied to the entire reference frame and the odd indexed parameters are ignored. It should be noted that for B-decoded frames, if the backward anchor is in the frame mode, Intensity compensation is not performed. Table 1 below summarizes application of these parameters depending on a type of frame coding modes of the reference and being decoded frames.

TABLE 1

| Decoded Frame | Forward Ref. Frame | Backward Ref. Frame | Parameters <iscale> and <ishift> for Stage 222A (N = 1) and Stage 222B (N = 2): | | | |
|---|---|---|---|---|---|---|
| Format | Format | Format | SN_0 | SN_1 | SN_2 | SN_3 |
| P Field/ Frame | Field | N/A | Top Ref. Field | Bottom Ref. Field | N/A | N/A |
| P Field | Frame | N/A | Top Ref. Field | Bottom Ref. Field | N/A | N/A |

TABLE 1-continued

| Decoded Frame Format | Forward Ref. Frame Format | Backward Ref. Frame Format | Parameters <iscale> and <ishift> for Stage 222A (N = 1) and Stage 222B (N = 2): | | | |
|---|---|---|---|---|---|---|
| | | | SN_0 | SN_1 | SN_2 | SN_3 |
| P Frame | Frame | N/A | Entire Ref. Frame | N/A | N/A | N/A |
| B Field/ Frame | Field | Field | Forward Top Ref. Field | Forward Bottom Ref. Field | Backward Top Ref. Field | Backward Bottom Ref. Field |
| B Frame | Frame | Field | Forward Top Ref. Field | Forward Bottom Ref. Field | Backward Top Ref. Field | Backward Bottom Ref. Field |
| B Frame | Frame | Frame | Entire Forward Ref. Frame | N/A | N/A | N/A |
| B Frame | Field | Frame | Forward Top Ref. Field | Forward Bottom Ref. Field | N/A | N/A |

The Control Pre-processor 214 is provided with Direct/Derived parameters of the reference frames. These parameters are extracted from Frame Coding Mode, Picture Type, Block Dimension, Motion Vector, and VC-profile syntax elements of the video bitstream. In particular, the Frame Coding Mode of decoded/reference frames is a syntax element indicating whether the respective frame is coded as an Interlaced Frame or Interlaced or Progressive Field, and the Picture Type of such frames is a syntax element indicating whether the frame is an I, P, B, or BI frame. The Motion Vector syntax element, nature of the Motion Vector (frame or field), and the reference frame associated with the Motion Vector correspond to blocks of the macroblock being decoded, and the VC-profile syntax element is a sequence header syntax element indicating the type of a profile (Simple, Main or Advanced) of the video bitstream.

The Control Pre-processor 214 operates for every reference block that is being fetched and sets the <field_mode>, <ref_pic_type>, <vc1_profile>, <b_p_frame>, and <start_y> parameters and configuration bits <1,2,3,4> for the Core 220.

The <field_mode> parameter indicates whether the reference block being fetched is a field block (only a top or bottom field of the reference is fetched) or a frame block (both top and bottom fields of the reference frame are fetched). In particular, when the picture being decoded is an Interlaced Field, depending on the polarity of the reference field, only the top or the bottom field is fetched. Correspondingly, when the picture being decoded is an Interlaced Frame and the current block being fetched has field motion vectors, depending on the polarity of the motion vectors, only the top or the bottom field is fetched.

The <ref_pic_type> parameter indicates whether the reference picture is of an Interlaced or Progressive type. This information used by the Core 220 to determine how to perform boundary extension during fetching of pixels of the reference frame.

The <vc1_profile> parameter indicates the profile (Simple, Main, or Advanced) of the video bitstream.

The <b_p_frame> parameter indicates whether the reference block is being fetched from a forward or backward reference frame. For P frames, this parameter is always set to a forward reference mode, and for B frames, depending on the direction of prediction, the parameter may be set to a forward or backward mode.

The <start_y> (Starting Vertical Position) parameters of the reference block are used to determine the starting vertical position of the reference block in a reference frame and include the following properties: vertical offset <mb_y> of a macroblock to which the reference block belongs, the reference block's vertical offset <blk_y> within the macroblock, integer vertical motion vector <mv_y> of the reference block, and a height <mb_h> of the macroblock.

The configuration bits <config_1>-config_4> are generally enable signals used by the Stages 222A and 222B. If the reference frame is an interlaced frame and a block being fetched is in a frame mode, these signals enable the Stage 222A (<config_1>, <config_2>) and Stage 222B (<config_3>, <config_4>) for fetching top and bottom fields of the reference frame, respectively. Correspondingly, if the reference frame is a progressive frame and a block being fetched is in a field mode, the signals <config_3> and <config_4> determine field polarity of the reference field and the signals <config_1>, <config_2> enable performing of Intensity Compensation calculations in the Stages 222A and 222B, respectively.

The Stages 222A and 222B have the same configurations. Each of the Stages 222A and 222B is controlled by the <SN_even_en> and <SN_odd_en> signals generated by the Enable Generator 224, where N defines a particular Stage 222 and N=1 for the Stage 222A and N=2 for the Stage 222B. The <SN_even_en> signal essentially enables the processing of the even-lines of the reference block being fetched. Similarly, the <SN_odd_en> signal enables processing of odd-lines of the reference block being fetched. When the enable signals are set to 0, the reference pixels pass through the respective stage without any operation being performed on them.

The enabling signals and processing of even-lines and odd-lines are subject to different parameters and, specifically, to a state of <even_line>, <SN_even>, and <SN_odd> signals generated by the Parameters Selector 228. The signal <even_line> is set to 1 when the current line being processed is an even line, otherwise else it is set to 0. The <SN_even> signal represents a combination of a scale signal <SN_scale_even> (8-bit, signed) and a shift signal <SN_shift_even> (16-bit, signed). Correspondingly, the <SN_odd> signal represents a combination of the respective scale and shift signals <SN_scale_odd> and <SN_shift_odd>.

Figure 3:
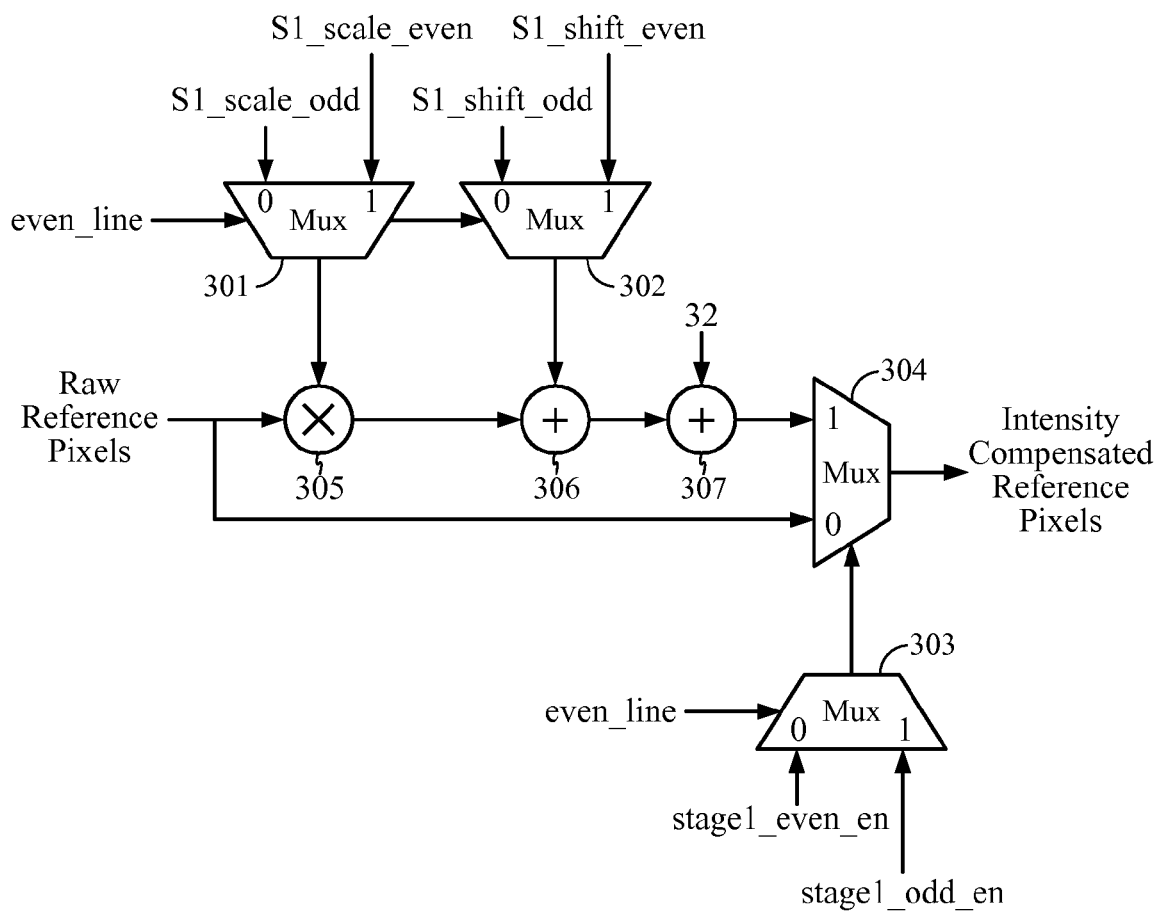
FIG. 3 shows a functional diagram of a Stage Engine of the decoder of FIG. 2.

Referring to FIG. 3, the Stage 222 (illustratively, functional diagram of the Stage 222A is shown) generally includes multiplexers 301-304, a multiplier 305, and adders 306 and 307. The multiplexers 301-303 are controlled by the <even_line> signal and are selectively inputted with the <S1_even_en>, <S1_scale_even>, <S1_scale_odd>, <S1_shift_even>, and <S1_shift_odd> signals.

The multiplexer 304 is controlled by an output signal of the multiplexer 303 and is inputted with (i) streaming data of raw (i.e., non-intensity-compensated) pixels of the video bitstream's reference frames and (ii) the same data after it is sequentially processed by the multiplier 305, and adders 306, 307. In operation, the multiplexer 304 outputs in real time (i.e., on-the-fly) of the intensity-compensated pixels of the respective reference frame.

Figure 4:
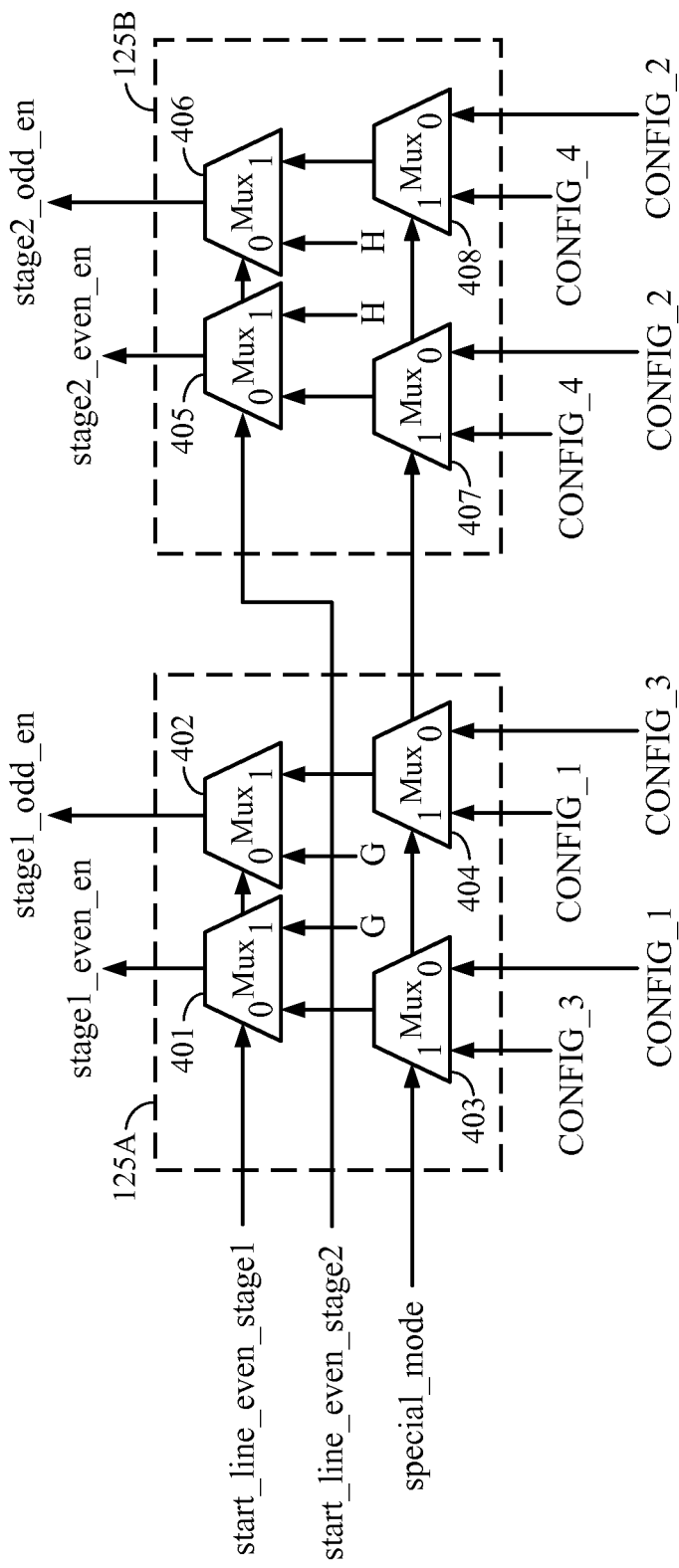
FIG. 4 shows a functional diagram of an Enable Generator of the decoder of FIG. 2.

Referring to FIG. 4, the Enable Generator 224 includes modules 125A and 125B, each module selectively controlling the Stage 222A or Stage 222B. The module 125A 125B comprise multiplexers 401-404 and 405-408, respectively, which are enabled by signals <start_line_even_SN> and <special_mode> generated by the Control Signals Generator 228 (discussed below in reference to FIG. 6) and inputted with the signals <config_1>-<config_4> generated by the Control Pre-processor 214. The <special_mode> signal refers to the case of Advanced profile of compression, in which frame mode access is enabled and a reference picture is decoded as an interlaced frame/field.

In operation, the modules 125A and 125B generate signals <SN_even_en> that used in the Stage 222A or Stage 222B. When the signals <SN_even_en> attain a logic state 1, even reference lines are intensity-compensated, otherwise original values of the reference lines are retained unchanged. Similarly, odd reference lines are intensity compensated when signals <SN_odd_en> attain a logic state 1, otherwise original values of the reference lines are retained unchanged.

Figure 5:
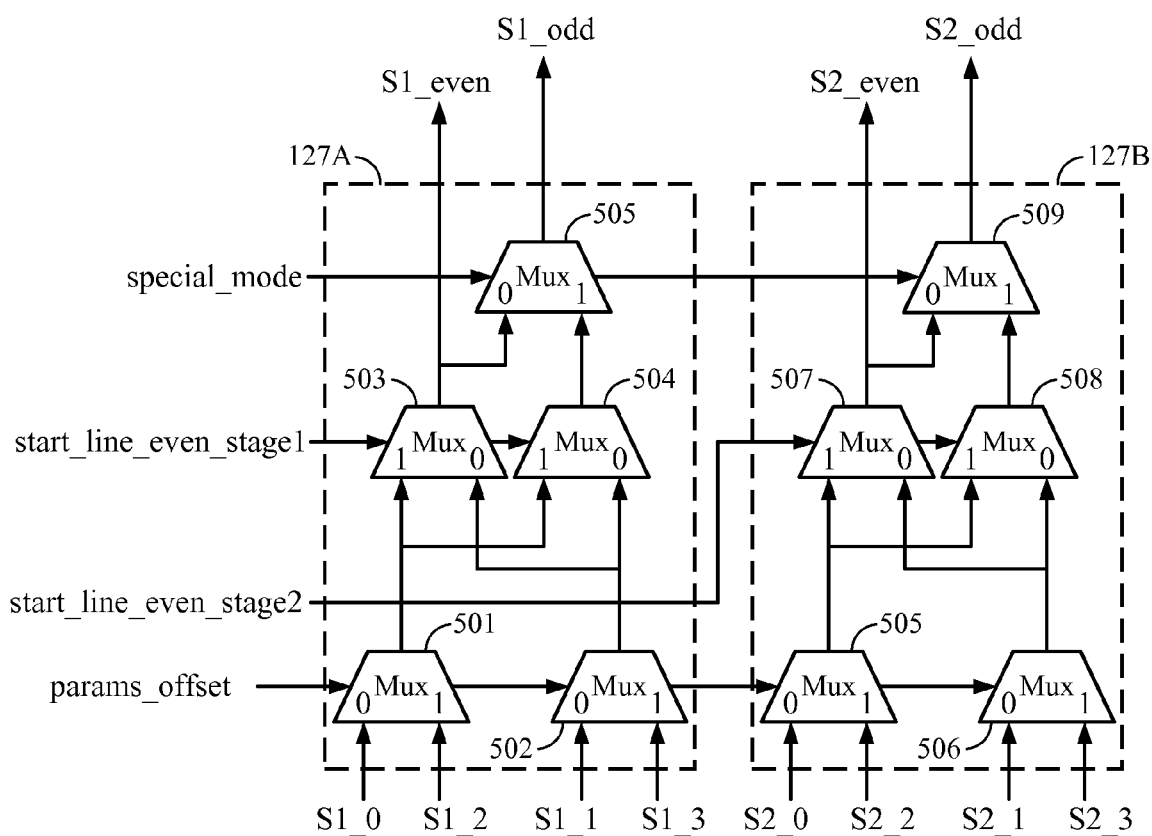
FIG. 5 shows a functional diagram of a Parameters Selector of the decoder of FIG. 2.

Referring to FIG. 5, the Parameters Selector 226 includes modules 127A and 127B, each module selectively controlling the Stage 222A or Stage 222B. The module 127A 127B comprise multiplexers 501-505 and 506-510, respectively, which are enabled by signals <start_line_even_SN>, <special_mode>, and <parameters_offset> generated by the Control Signals Generator 228 and selectively inputted with signals <SN0>-<SN3> generated by the Parameters Pre-processor 212. The <parameters_offset> signal signifies either forward of backward reference parameters in the case of Advanced profile of compression, and output signals <SN_even> and <SN_odd> are used in the Stages 222A, 222B for processing even and odd lines of reference frames, respectively.

Figure 6:
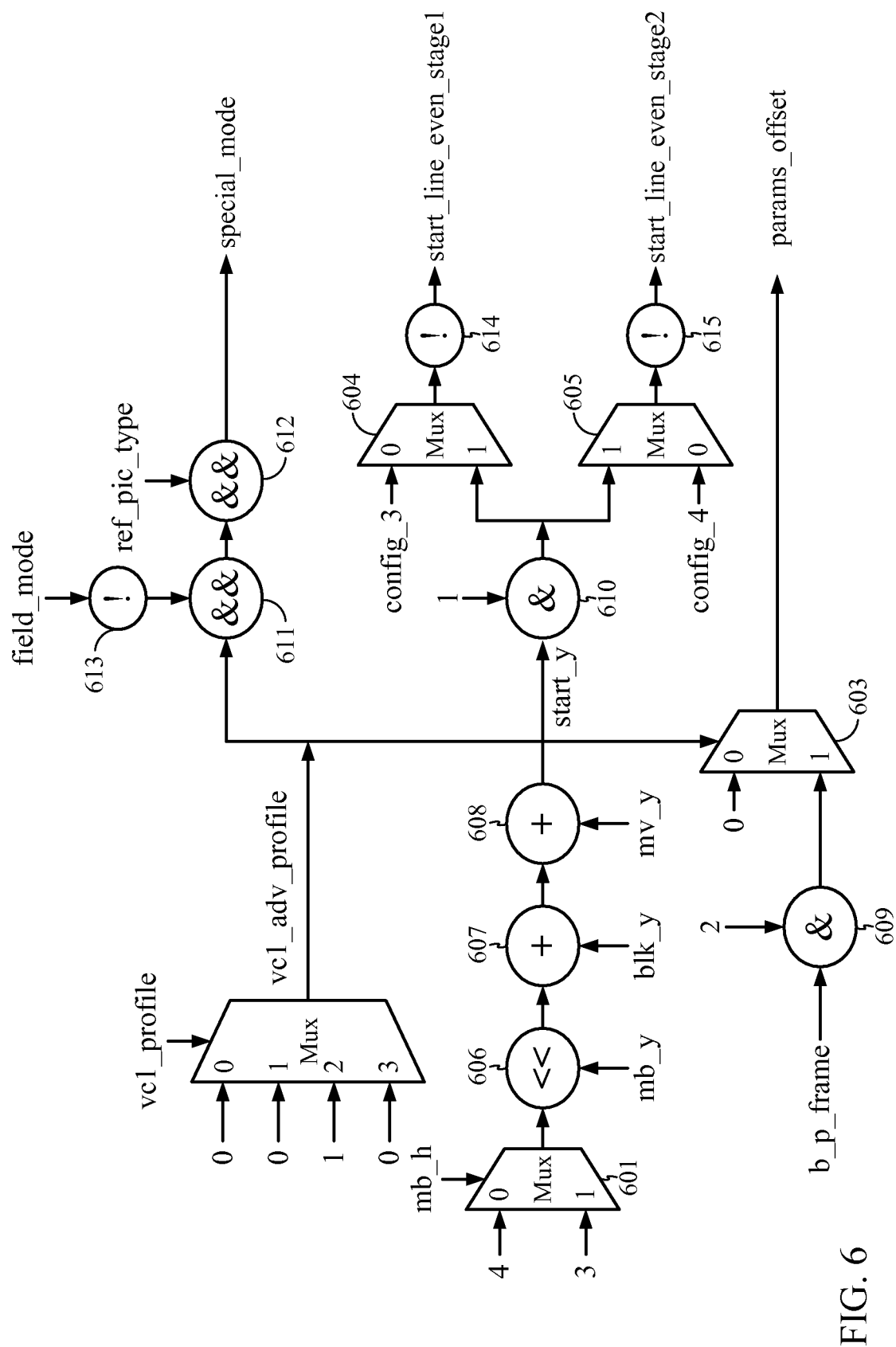
FIG. 6 shows a functional diagram of a Control Signals Generator of the decoder of FIG. 2.

Referring to FIG. 6, the Control Signals Generator 228 includes multiplexers 601-605, shifter 606, adders 607 and 608, arithmetic AND (609, 610) and logic AND (611, 612) elements, and inverters 613-615. Components of the Control Signals Generator 228 are inputted with signals <field_mode>, <ref_picture_type>, <vc1_profile>, <b_p_frame>, <blk_y>, <mb_y>, <mv_y>, <mb_h>, <frame_h>, and <config_1>-<config_4>. These signals are generated by the Parameters Pre-processor 212 using syntax elements derived from the processed video bitstream, as discussed above on reference to FIG. 2, and <1> and <2> are probe signals testing states of the signals <start_y> and <b_p_frame>, respectively. In operation, the Control Signals Generator 228 outputs the <start_line_even_SN>, <special_mode>, and <parameters_offset> signals for the Parameters Selector 226.

Figure 7A:
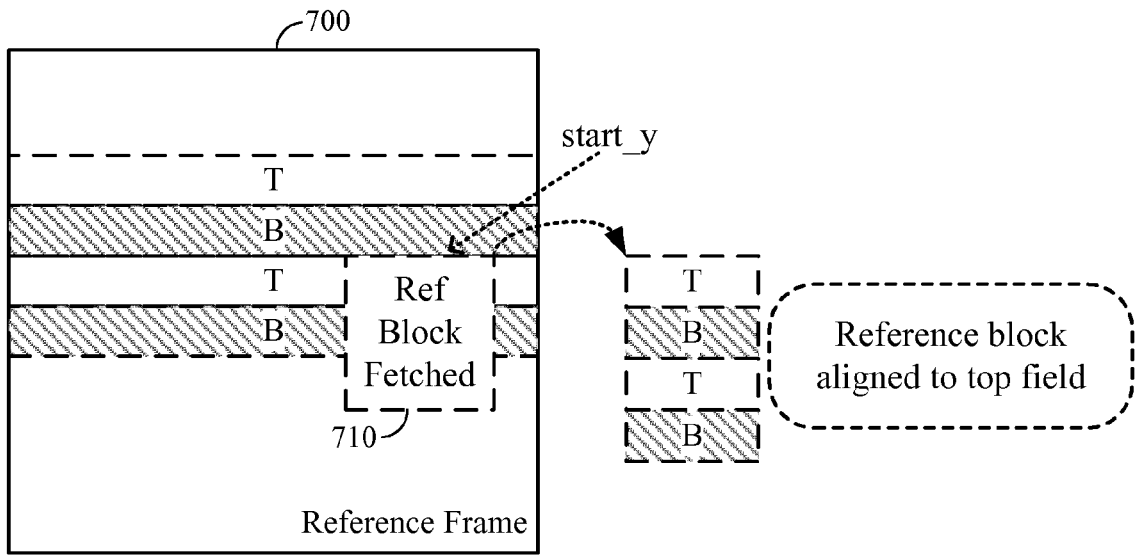
FIGS. 7A-7B show functional diagrams illustrating portions of intensity compensation operations in the decoder of FIG. 2.
Figure 7B:
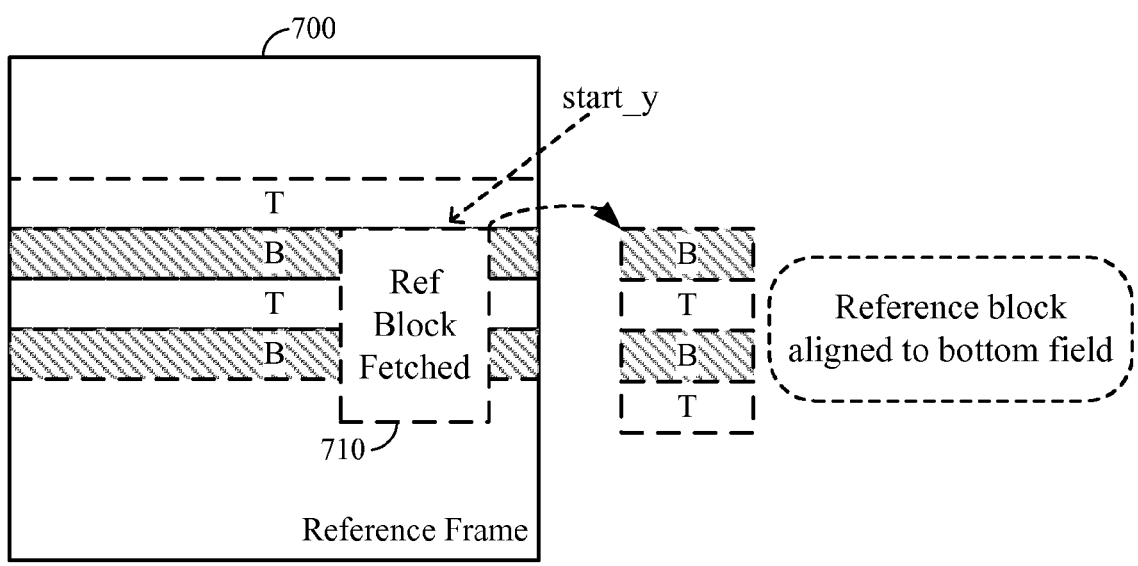

Referring to FIGS. 7A-7B, the <start_line_even_SN> signal indicates the starting vertical index of the first line in a block 710 being fetched of a being processed reference frame 700. In case of frame mode block access from an interlaced reference, the Core 220 uses this information to determine whether the block 710 is aligned to the top (T) or bottom (B) field of the reference. If the block 710 is aligned to the top field of the reference (FIG. 7B), then the even/odd lines of the block undergo intensity compensation using the top/bottom field parameters of the reference, respectively. Correspondingly, if the block 710 is aligned to the bottom field of the reference (FIG. 7B), then the even/odd lines of the block undergo intensity compensation using the bottom/top field parameters of the reference, respectively.

Figure 8:
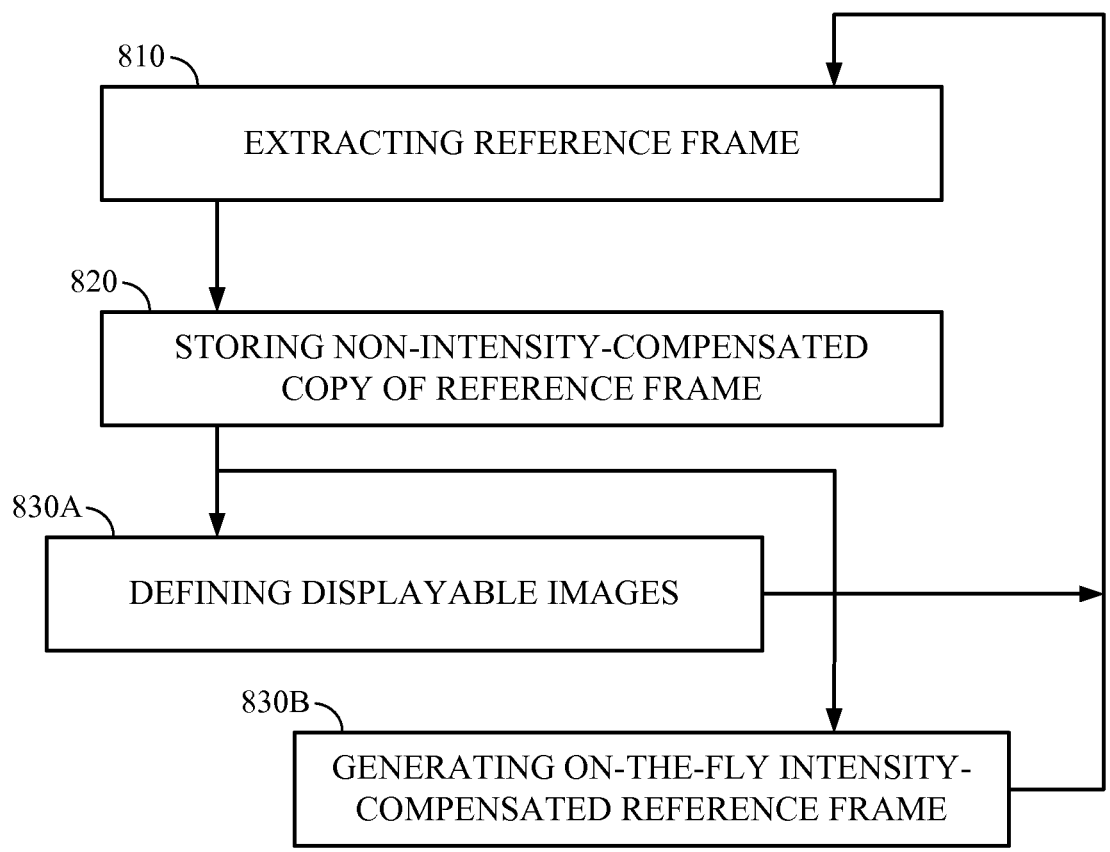
FIG. 8 shows a flow chart of a method for on-the-fly generation of intensity-compensated reference frames using the decoder of FIG. 2.

FIG. 8 shows a flow chart illustrating a method 800 for on-the-fly generation of intensity-compensated reference frames using the decoder 115. At step 810, non-intensity-compensated reference frames are sequentially extracted from a video bitstream by components of the digital section 110. Then, at step 820, a copy of a non-intensity-compensated reference frame is stored (for example, in the internal memory 126 of the digital section 110). Then, the stored copy is used for defining displayable images (step 830A) and for on-the-fly generation of a stream of intensity-compensated pixels to perform motion compensation calculations for frames of the video bitstream (step 830B). These steps are sequentially repeated for all reference frames of the video bitstream.

In exemplary embodiments, the method 800 may be implemented in hardware, software, firmware, or any combination thereof in a form of a computer program product comprising one or more computer-executable instructions. When implemented in software, the computer program product may be stored on or transmitted using a computer-readable medium, which includes computer storage medium and computer communication medium.

The term "computer storage medium" refers herein to any medium adapted for storing the instructions that cause the computer to execute the method 800. By way of example, and not limitation, the computer storage medium may comprise solid-sate memory devices, including electronic memory devices (e.g., RAM, ROM, EEPROM, and the like), optical memory devices (e.g., compact discs (CD), digital versatile discs (DVD), and the like), or magnetic memory devices (e.g., hard drives, flash drives, tape drives, and the like), or other memory devices adapted to store the computer program product, or a combination of such memory devices.

The term "computer communication medium" refers herein to any physical interface adapted to transmit the computer program product from one place to another using for example, a modulated carrier wave, an optical signal, a DC or AC current, and the like means. By way of example, and not limitation, the computer communication medium may comprise twisted wire pairs, printed or flat cables, coaxial cables, fiber-optic cables, digital subscriber lines (DSL), or other wired, wireless, or optical serial or parallel interfaces, or a combination thereof.

The previous description of the disclosed configurations is provided to enable any person skilled in the art to make or use the disclosure. Various modifications to these configurations will be readily apparent to those skilled in the art, and the generic principles defined herein may be applied to other configurations without departing from the spirit or scope of the disclosure. Thus, the disclosure is not intended to be limited to the configurations shown herein but is to be accorded the widest scope consistent with the principles and novel features disclosed herein.

What is claimed is:

1. An integrated circuit (IC) for video processing, the IC comprising:
    a processor configured to, upon execution of instructions,
        (i) reconstruct reference frames from a video bitstream,
        (ii) store a non-intensity-compensated copy of a reference frame of the video bitstream, and (iii) determine a set of values of properties based at least in part on syntax elements of the video bitstream, wherein the properties comprise even indexed properties to be applied to top reference fields of the reference frame and odd indexed properties to be applied to bottom reference fields of the reference frame, (iv) extract a set of direct/derived parameters of the reference frame from the video bitstream, wherein the direct/derived parameters comprise a field mode parameter to identify whether the reference frame is coded in a field coding mode or a frame coding mode, (v) based at least in part on the set of direct/derived parameters, use a first subset of the set of values of properties to perform a first intensity compensation operation on the reference frame, wherein, depending on the field mode parameter, the first subset of the set of values of the properties comprises one of (1) both the even indexed properties and the odd indexed properties or (2) one of the even indexed properties or the odd indexed properties, (vi) based at least in part on the set of direct/derived parameters, use a second subset of the set of values of properties to perform a second intensity compensation operation on a result of the first intensity compensation operation, (vii) utilize a result of the second intensity compensation operation for defining displayable images and for on-the-fly generating a stream of intensity-compensated pixels used to perform motion compensation calculations for frames of the video bitstream; and a memory containing said instructions.

2. The integrated circuit of claim 1, further comprising a decoder module operative to generate said stream of intensity-compensated pixels using the syntax elements and the direct/derived parameters of the video bitstream and properties of pixels of the reference frame.

3. The integrated circuit of claim 2, wherein at least a portion of the decoder module is a component of the processor.

4. The integrated circuit of claim 2, wherein at least a portion of the decoder module is implemented as a set of instructions executable by the processor.

5. The integrated circuit of claim 1, wherein said syntax elements include LUMSCALE and LUMSHIFT syntax elements, and the direct/derived parameters are extracted from Frame Coding Mode, Picture Type, Block Dimension, Motion Vector, and VC-profile syntax elements.

6. The integrated circuit of claim 1, wherein said integrated circuit is a portion of a wireless device selected from the group consisting of a cellular phone, a video game console, a personal digital assistant (PDA), a laptop computer, a video-enabled device, an audio/video-enabled device, and a server.

7. An apparatus for video processing, the apparatus comprising:
a processor configured to, upon execution of instructions, (i) reconstruct reference frames from a video bitstream, (ii) store a non-intensity-compensated copy of a reference frame of the video bitstream, and (iii) determine a set of values of properties based at least in part on syntax elements of the video bitstream, wherein the properties comprise even indexed properties to be applied to top reference fields of the reference frame and odd indexed properties to be applied to bottom reference fields of the reference frame, (iv) extract a set of direct/derived parameters of the reference frame from the video bitstream, wherein the direct/derived parameters comprise a field mode parameter to identify whether the reference frame is coded in a field coding mode or a frame coding mode, (v) based at least in part on the set of direct/derived parameters, use a first subset of the set of values of properties to perform a first intensity compensation operation on the reference frame, wherein, depending on the field mode parameter, the first subset of the set of values of the properties comprises one of (1) both the even indexed properties and the odd indexed properties or (2) one of the even indexed properties or the odd indexed properties, (vi) based at least in part on the set of direct/derived parameters, use a second subset of the set of values of properties to perform a second intensity compensation operation on a result of the first intensity compensation operation, (vii) utilize a result of the second intensity compensation operation for defining displayable images and for on-the-fly generating a stream of intensity-compensated pixels used to perform motion compensation calculations for frames of the video bitstream; and a memory containing said instructions.

8. The apparatus of claim 7, further comprising a decoder module configured to generate said stream of intensity-compensated pixels using the syntax elements and the direct/derived parameters of the video bitstream and properties of pixels of the reference frame.

9. The apparatus of claim 8, wherein at least a portion of the decoder module is a component of the processor.

10. The apparatus of claim 8, wherein at least a portion of the decoder module is implemented as a set of instructions executable by the processor.

11. The apparatus of claim 7, wherein said syntax elements include LUMSCALE and LUMSHIFT syntax elements, and the direct/derived parameters are extracted from Frame Coding Mode, Picture Type, Block Dimension, Motion Vector, and VC-profile syntax elements.

12. The apparatus of claim 7, wherein said apparatus is a portion of a wireless device selected from the group consisting of a cellular phone, a video game console, a personal digital assistant (PDA), a laptop computer, a video-enabled device, an audio/video-enabled device, and a server.

13. An apparatus for video processing, the apparatus comprising:
first means for reconstructing reference frames from a video bitstream;
second means for storing a non-intensity-compensated copy of a reference frame of the video bitstream; and
third means for determining a set of values of properties based at least in part on syntax elements of the video bitstream, wherein the properties comprise even indexed properties to be applied to top reference fields of the reference frame and odd indexed properties to be applied to bottom reference fields of the reference frame;
fourth means for extracting a set of direct/derived parameters of the reference frame from the video bitstream, wherein the direct/derived parameters comprise a field mode parameter to identify whether the reference frame is coded in a field coding mode or a frame coding mode;
fifth means for, based at least in part on the set of direct/derived parameters, using a first subset of the set of values of properties to perform a first intensity compensation operation on the reference frame, wherein, depending on the field mode parameter, the first subset of the set of values of the properties comprises one of (1) both the even indexed properties and the odd indexed properties or (2) one of the even indexed properties or the odd indexed properties;
sixth means for, based at least in part on the set of direct/derived parameters, using a second subset of the set of values of properties to perform a second intensity compensation operation on a result of the first intensity compensation operation;
seventh means for utilizing a result of the second intensity compensation operation for defining displayable images and for on-the-fly generating a stream of intensity-compensated pixels used to perform motion compensation calculations for frames of the video bitstream.

14. The apparatus of claim 13, wherein the seventh means is further configured to generate said stream of intensity-compensated pixels using the syntax elements and the direct/derived parameters of the video bitstream and properties of pixels of the reference frame.

15. The apparatus of claim 14, wherein said syntax elements include LUMSCALE and LUMSHIFT syntax elements, and the direct/derived parameters are extracted from Frame Coding Mode, Picture Type, Block Dimension, Motion Vector, and VC-profile syntax elements.

16. A computer program product including a non-transitory computer readable medium having instructions, for video processing, for causing a computer to:
reconstruct reference frames from a video bitstream;
store a non-intensity-compensated copy of a reference frame of the video bitstream; and
determine a set of values of properties based at least in part on syntax elements of the video bitstream, wherein the properties comprise even indexed properties to be applied to top reference fields of the reference frame and odd indexed properties to be applied to bottom reference fields of the reference frame;
extract a set of direct/derived parameters of the reference frame from the video bitstream, wherein the direct/derived parameters comprise a field mode parameter to identify whether the reference frame is coded in a field coding mode or a frame coding mode;
based at least in part on the set of direct/derived parameters, use a first subset of the set of values of properties to perform a first intensity compensation operation on the reference frame, wherein, depending on the field mode parameter, the first subset of the set of values of the properties comprises one of (1) both the even indexed properties and the odd indexed properties or (2) one of the even indexed properties or the odd indexed properties;
based at least in part on the set of direct/derived parameters, use a second subset of the set of values of properties to perform a second intensity compensation operation on a result of the first intensity compensation operation;
utilize a result of the second intensity compensation operation for defining displayable images and for on-the-fly generating a stream of intensity-compensated pixels used to perform motion compensation calculations for frames of the video bitstream.

17. The computer program product of claim 16, wherein the instructions further cause the computer to form a decoder configured to generate said stream of intensity-compensated pixels using syntax elements and direct/derived parameters of the video bitstream and properties of pixels of the reference frame.

18. The computer program product of claim 16, wherein said syntax elements include LUMSCALE and LUMSHIFT syntax elements, and the direct/derived parameters are extracted from Frame Coding Mode, Picture Type, Block Dimension, Motion Vector, and VC-profile syntax elements.

19. A method for video processing, the method comprising:
reconstructing, with a processor, reference frames from a video bitstream;
storing, with the processor, a non-intensity-compensated copy of a reference frame of the video bitstream; and
determining, with the processor, a set of values of properties based at least in part on syntax elements of the video bitstream, wherein the properties comprise even indexed properties to be applied to top reference fields of the reference frame and odd indexed properties to be applied to bottom reference fields of the reference frame;
extracting, with the processor, a set of direct/derived parameters of the reference frame from the video bitstream, wherein the direct/derived parameters comprise a field mode parameter to identify whether the reference frame is coded in a field coding mode or a frame coding mode;
based at least in part on the set of direct/derived parameters, with the processor, using a first subset of the set of values of properties to perform a first intensity compensation operation on the reference frame, wherein, depending on the field mode parameter, the first subset of the set of values of the properties comprises one of (1) both the even indexed properties and the odd indexed properties or (2) one of the even indexed properties or the odd indexed properties;
based at least in part on the set of direct/derived parameters, with the processor, using a second subset of the set of values of properties to perform a second intensity compensation operation on a result of the first intensity compensation operation;
utilizing, with the processor, a result of the second intensity compensation operation for defining displayable images and for on-the-fly generating a stream of intensity-compensated pixels used to perform motion compensation calculations for frames of the video bitstream.

20. The method of claim 19, wherein said syntax elements include LUMSCALE and LUMSHIFT syntax elements, and the direct/derived parameters are extracted from Frame Coding Mode, Picture Type, Block Dimension, Motion Vector, and VC-profile syntax elements.

21. The IC of claim 1, wherein the video bitstream is a VC1-SMPTE (Society of Motion Picture and Television Engineers) standard, Advanced profile compliant video bitstream.

22. The apparatus of claim 7, wherein the video bitstream is a VC1-SMPTE (Society of Motion Picture and Television Engineers) standard, Advanced profile compliant video bitstream.

23. The apparatus of claim 13, wherein the video bitstream is a VC1-SMPTE (Society of Motion Picture and Television Engineers) standard, Advanced profile compliant video bitstream.

24. The computer program product of claim 16, wherein the video bitstream is a VC1-SMPTE (Society of Motion Picture and Television Engineers) standard, Advanced profile compliant video bitstream.

25. The method of claim 19, wherein the video bitstream is a VC1-SMPTE (Society of Motion Picture and Television Engineers) standard, Advanced profile compliant video bitstream.

* * * * *